Figure 1:
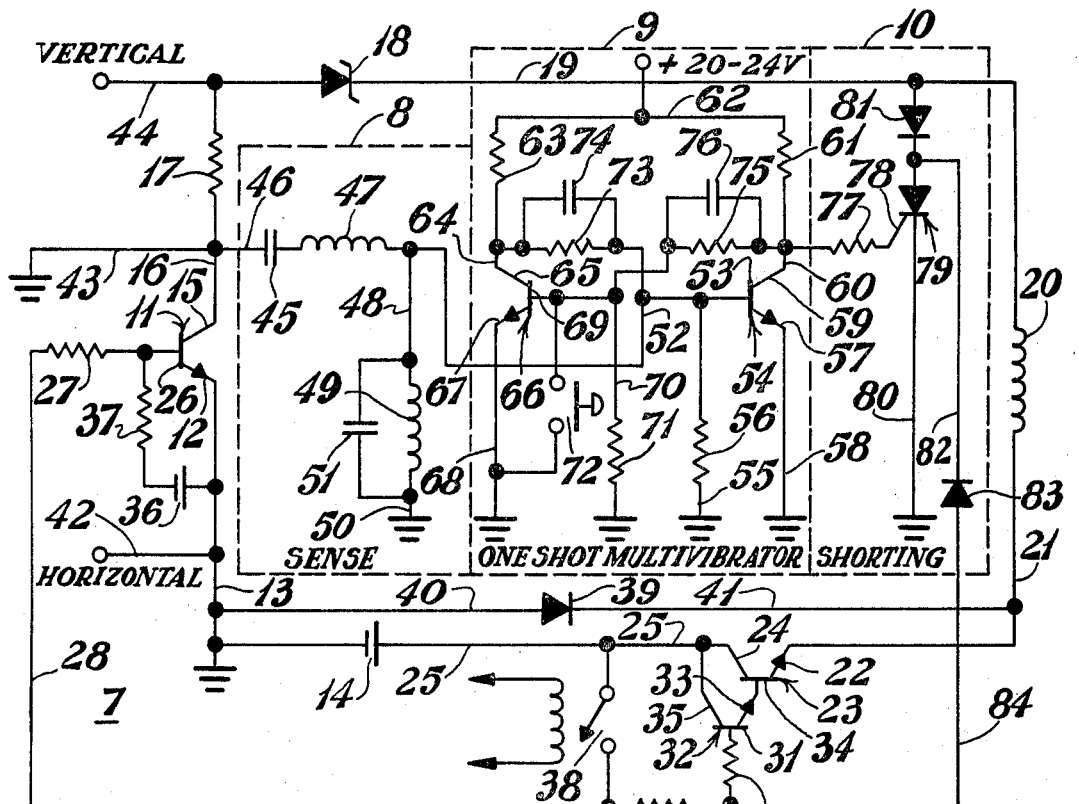

Sept. 10, 1968 R. W. BOLVIN ET AL 3,401,306

REVERSE BIAS SECOND BREAKDOWN PROTECTOR

Filed June 3, 1966

INVENTORS
WAYNE N. BOLAN
BY ROBERT W. BOLVIN

ATTORNEY

United States Patent Office 3,401,306
Patented Sept. 10, 1968

3,401,306
REVERSE BIAS SECOND BREAKDOWN PROTECTOR
Robert W. Bolvin, Wall, and Wayne N. Bolan, Matawan, N.J., assignors to The Bendix Corporation, a corporation of Delaware
Filed June 3, 1966, Ser. No. 555,150
5 Claims. (Cl. 317—16)

The present invention relates to semi-conductor devices and more particularly to a circuit for testing such devices.

Heretofore in measuring certain parameters of semiconductor devices excess currents could occur that would damage the devices under test. Further, if a predetermined current was set, it would not be adequate in some cases and would be too high in others.

The present invention provides a test circuit for testing semi-conductor devices in which a sensing circuit activates a short circuit path to ground to remove any excess current from the device under test.

It is an object of the invention to provide an improved test circuit.

Another object of the invention is to provide improved means for preventing excess currents in transistors under test.

Another object of the invention is to provide improved means for measuring second breakdown of transistors.

The above and other objects and features of the invention will appear more fully hereinafter from a consideration of the following description taken in connection with the accompanying drawing wherein one example is illustrated by way of example:

In the drawing:

FIGURE 1 is a schematic diagram of a circuit embodying the invention.

FIGURES 2, 3, 4, and 5 are curves for an explanation of the invention.

Referring now to the drawings a test circuit indicated generally by the numeral 6 comprises four basic parts, an inductive sweep 7, a sensing circuit 8, a multivibrator 9 and a shorting circuit 10. In the inductive sweep circuit 7, a transistor 11, to be tested, has an emitter 12 connected by conductor 13 to the negative terminal of a battery 14 and also to ground. The transistor 11 has a collector 15 connected by conductor 16 and resistor 17 to one side of Zener diode 18. The other side of the Zener diode 18 is connected by conductor 19 to one side of inductance 20. The other side of the inductance 20 is connected by conductor 21 to emitter 22 of a transistor 23. The transistor 23 has a collector 24 which is connected by conductor 25 to the positive side of the battery 14.

The transistor 11 also has a base 26 connected to resistor 27, conductor 28, resistor 29, and resistor 30 to base 31 of a transistor 32. The transistor 32 has an emitter 33 connected to base 34 of the transistor 23 and a collector 35 connected to the collector 24 of the transistor 23 and in a Darlington configuration. A battery 36 has its positive terminal connected to the conductor 13 and its negative terminal connected through resistor 37 to the base 26 of the transistor 11. A relay 38 is connected between the conductors 25 and 28. A diode 39 is connected by conductors 40 and 41 between the conductors 13 and 21.

An oscilloscope (not shown) has the horizontal connected by conductor 42 to conductor 13, the floating ground by conductor 43 and the vertical by conductor 44 to the junction between the resistor 17 and the Zener diode 18.

The sensing circuit 8 includes a capacitor 45 having one side connected by conductor 46 to the conductor 16 and the other side connected to one side of an inductance 47. The other side of the inductance 47 is connected by conductor 48 to one side of an inductance 49 which has its other side connected by conductor 50 to ground. A capacitor 51 is connected across the inductance 49.

Conductor 52 connects the output from the sensing circuit 8 to base 53 of transistor 54 in the multivibrator circuit 9. The base 53 of the transistor 54 is also connected by conductor 55 to ground through resistor 56. The transistor 54 has an emitter 57 through conductor 58 connected to ground and collector 59 connected by conductor 60, resistor 61 and conductor 62 to a suitable source of DC power. Also connected to the source of power by conductor 62, resistor 63 and conductor 64 is collector 65 of a transistor 66 which has an emitter 67 connected to ground by conductor 68. The transistor 66 also has a base 69 which is connected to ground by conductor 70 and resistor 71. Also the base 69 is connected through switch 72 to ground. Resistor 73 is connected between the collector 65 of the transistor 66 and the base 53 of the transistor 54 and a capacitor 74 is connected across the resistor 73. Also a similar resistor 75 is connected between the collector 59 of the transistor 54 and the base 69 of the transistor 66 with a capacitor 76 connected across the resistor 75.

The output from the multivibrator is connected from the conductor 60 through resistor 77 to gate 78 of a silicon controlled rectifier (SCR) 79 in the shorting circuit 10. One side of the SCR 79 is connected by conductor 80 to the ground and the other side is connected through diode 81 to the conductor 19 and also by conductor 82, diode 83 and conductor 84 to the junction between resistors 29 and 30.

Figure 2:
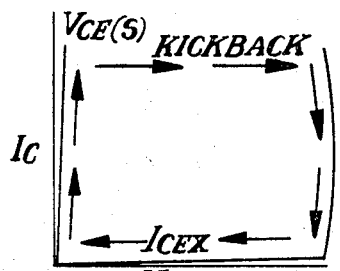

In operation, when the relay 38 is closed, base current is supplied by the battery 14 to the transistor 11 through resistor 27 and over the base-emitter junction. Some current also passes through the resistor 37 and battery 36. The battery 36 supplies reverse bias for the transistor 11 over the resistor 37 when the relay 38 is open. Base current is also supplied to the transistors 23 and 32, which are connected in a Darlington configuration, over the resistors 29 and 30, base emitter junctions, inductance 20, diode 18, resistor 17 and transistor 11. Collector current now flows from the battery 14 through the transistor 23, inductance 20, diode 18, resistor 17, transistor 23, inductance 20, transistor 11 and back to the battery 14. The value of this collector current is determined by the value of the voltage applied from the battery 14. When the relay 28 opens, base current is removed from the transistors 11, 23 and 32. Since the inductance 20 will not permit the collector current to fall to zero, it forces the current through the transistor 11 until the voltage developed is sufficient to reach the avalanche characteristic of the transistor 11. The current then goes toward zero along the collector emitter avalanche characteristic as illustrated in FIGURE 2. Current is also forced through the transistors 23 and 32 until the collector emitter voltage exceeds the forward drop of diode 39. When this happens, the kickback current is shunted around the battery 14, transistors 23 and 32 and through the diode 39.

Figure 3:
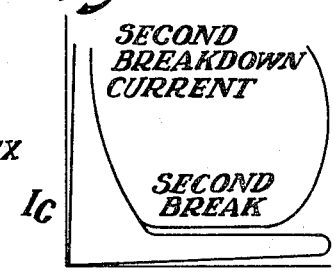
Figure 4:
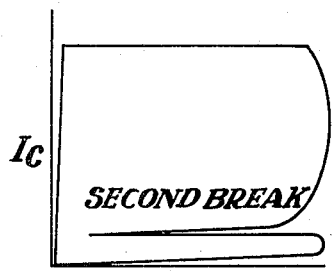

Transistors 23 and 32 shut off the battery 14 during the kickback from the inductance 20. Should second breakdown occur during this test and the battery 14 not blocked, a high current would occur as seen in FIGURE 3. Since an increase in current is not possible from the inductor 20, no current may be drawn from the battery 14 if it is blocked. In this case, if second breakdown occurs, the trace would be as illustrated in FIGURE 4. This condition would still destroy a large percentage of the transistors under test, hence additional circuitry is needed for protection.

Figure 5:
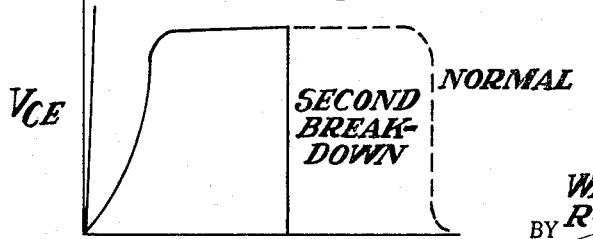

The sensing circuit is designed to pass predetermined frequencies and to reject all other frequencies which may cause pretriggering. When second breakdown occurs, the collector emitter voltage of the transistor 11 drops from its original value to some low value at the predetermined frequency rate as shown in FIGURE 5.

The predetermined frequency oscillation is passed by capacitor 45 and inductance 47 to the base 53 of the transistor 54 of the multivibrator 9. The transistor 54 is in its conductive state while the transistor 66 is in its nonconductive state. The resistor 73, capacitor 74, resistor 75 and capacitor 76 are the timing components for the multivibrator 9. When the oscillations appear at the base 53 of the transistor 54, it rapidly goes towards its nonconductive state and the transistor 66 starts to conduct. The voltage across the collector emitter of the transistor 54 rises to its maximum value determined by the input voltage of the multivibrator. When this voltage reaches a value sufficient to supply enough gate current to the SCR 79, it is triggered to its conductive state.

The SCR 79 provides a short circuit path to ground for the kickback of the inductance 20 which removes the current through the diode 18, resistor 17 and transistor 11. The diode 83 provides a low impedance path for the base current of the transistors 23 and 32 in order that when the relay 38 closes after the SCR 79 has triggered they will not conduct. The impedance of the resistor 30 is larger than the impedance seen through diode 83 and SCR 79 to ground. The SCR 79 is held on by the gate current supplied by the voltage across the transistor 54. The diode 81 blocks the current of the battery 14 and the diode 84 blocks the kickback current of the inductor 20. The diode 18 supplies some impedance to the kickback current assuring a lower impedance path through the diode 81 and the SCR 79 to ground. When the SCR 79 triggers, the entire circuit is shut off before the transistor 11 can be damaged. The circuit is reset by closing the switch 72.

Although only one embodiment of the invention has been illustrated and described, various changes in the form and relative arrangement of the parts, which will now appear to those skilled in the art, may be made without departing from the scope of the invention.

What is claimed is:

1. A reverse bias second breakdown protection circuit for a transistor, comprising an inductive sweep circuit, means connecting a transistor in said circuit, a source of current connected to said transistor, a sensing circuit responsive to a predetermined rate of voltage drop across the collector emitter of said transistor, a multivibrator circuit, circuit means connecting said multivibrator circuit for energization from said sensing circuit, a shorting circuit, other circuit means connecting said shorting circuit to the output of said multivibrator, said shorting circuit being responsive to the output of said multivibrator being above a predetermined value to form a short circuit path around said transistor.

2. The combination as set forth in claim 1 in which said shorting circuit included a silicon controlled rectifier.

3. The combination as set forth in claim 1 and including a relay in said inductive sweep circuit for initiating an inductive sweep.

4. The combination as set forth in claim 1 and including means for blocking off the source of current from the inductive kick-back current.

5. The combination as set forth in claim 1 and including means for holding the signal controlled rectifier in a conducting state.

References Cited

UNITED STATES PATENTS

| | | | |
|---|---|---|---|
| 2,922,945 | 1/1960 | Norris et al. | 323—22 |
| 3,293,495 | 12/1966 | Smith | 317—11 |
| 3,295,020 | 12/1966 | Borkovitz | 317—33 |

LEE T. HIX, *Primary Examiner.*

J. D. TRAMMELL, *Assistant Examiner.*